US011853930B2

(12) United States Patent
Copeland et al.

(10) Patent No.: US 11,853,930 B2
(45) Date of Patent: Dec. 26, 2023

(54) DYNAMIC LEAD GENERATION

(71) Applicant: Accenture Global Solutions Limited, Dublin (IE)

(72) Inventors: Shannon L. Copeland, Atlanta, CA (US); Burton M. Smith, III, Atlanta, GA (US)

(73) Assignee: Accenture Global Solutions Limited, Dublin (IE)

( * ) Notice: Subject to any disclaimer, the term of this patent is extended or adjusted under 35 U.S.C. 154(b) by 138 days.

(21) Appl. No.: 15/844,512

(22) Filed: Dec. 15, 2017

(65) Prior Publication Data

US 2019/0188617 A1    Jun. 20, 2019

(51) Int. Cl.
| G06Q 10/0631 | (2023.01) |
| G06F 16/903 | (2019.01) |
| G06Q 30/0202 | (2023.01) |
| G06Q 30/0204 | (2023.01) |

(Continued)

(52) U.S. Cl.
CPC .  G06Q 10/06311 (2013.01); G06F 16/90335 (2019.01); G06Q 30/0202 (2013.01); G06Q 30/0205 (2013.01); G06N 5/02 (2013.01); H04M 3/5183 (2013.01)

(58) Field of Classification Search
CPC ........ G06Q 10/06311; G06Q 30/0202; G06Q 30/0205

See application file for complete search history.

(56) References Cited

U.S. PATENT DOCUMENTS

| 6,785,380 B2 | 8/2004 | Ribera |
| 6,829,603 B1 | 12/2004 | Chai et al. |
| 7,275,083 B1 | 9/2007 | Seibel et al. |

(Continued)

FOREIGN PATENT DOCUMENTS

| KR | 1020180058877 | 7/2018 |
| WO | 2016139666 A1 | 9/2016 |
| WO | WO-2016183229 A1 * | 11/2016 ........... G06F 16/245 |

OTHER PUBLICATIONS

Davies, J., Fensel, D., van Harmelen, F., "Towards the Semantic Web," 2003, John Wiley & Sons, LTD, pp. 19-40 (Year: 2003).*

(Continued)

Primary Examiner — Sara Grace Brown
(74) Attorney, Agent, or Firm — Fish & Richardson P.C.

(57) ABSTRACT

A system for electronic lead generation including a semantic graph database including a knowledge graph and a dynamic profiling module comprising automated computing machinery configured to identify a near-term surge in product interest for a number of companies of a particular size in a particular industry in a particular region of the world in dependence upon the knowledge graph and create a company profile in dependence upon the size of the identified companies, the industry of the identified companies, and the region of the world of the identified companies associated with the near-term surge. Embodiments also include a lead purchase module comprising automated computing machinery configured to generate an electronic lead purchase order in dependence upon the company profile; transmit the lead purchase order to a lead generation engine; and receive, from the lead generation engine, a plurality of leads in dependence upon the lead purchase order.

5 Claims, 5 Drawing Sheets

(51) Int. Cl.
  *G06N 5/02* (2023.01)
  *H04M 3/51* (2006.01)

(56) References Cited

U.S. PATENT DOCUMENTS

| | | |
|---|---|---|
| 7,486,785 B2 | 2/2009 | Flores |
| 8,108,237 B2 | 1/2012 | Bourne et al. |
| 8,332,279 B2 | 12/2012 | Woolston |
| 8,411,843 B1 | 4/2013 | Cyriac |
| 9,049,295 B1 | 6/2015 | Cooper |
| 9,165,556 B1 | 10/2015 | Sugar |
| 9,848,082 B1 | 12/2017 | Lilland |
| 9,860,391 B1 | 1/2018 | Wu et al. |
| 9,948,783 B1 | 4/2018 | Farrell |
| 10,026,092 B2 | 7/2018 | Heater et al. |
| 10,101,976 B2 | 10/2018 | Cavalcante |
| 10,303,466 B1 | 5/2019 | Karman |
| 10,467,647 B2* | 11/2019 | Kim .................. G06Q 30/0244 |
| 10,482,384 B1 | 11/2019 | Stoilos |
| 2003/0126136 A1 | 7/2003 | Omoigui |
| 2004/0143473 A1 | 7/2004 | Tivey et al. |
| 2005/0005266 A1 | 1/2005 | Datig |
| 2005/0044357 A1 | 2/2005 | Fano |
| 2005/0105712 A1 | 5/2005 | Williams et al. |
| 2006/0095273 A1 | 5/2006 | Montvay et al. |
| 2006/0098625 A1 | 5/2006 | King |
| 2006/0239439 A1 | 10/2006 | Blackwood |
| 2007/0019618 A1 | 1/2007 | Shaffer |
| 2007/0064913 A1 | 3/2007 | Shaffer |
| 2007/0094183 A1 | 4/2007 | Paek et al. |
| 2007/0233561 A1 | 10/2007 | Golec |
| 2008/0162498 A1 | 7/2008 | Omoigui |
| 2008/0275744 A1 | 11/2008 | MacIntyre et al. |
| 2009/0070322 A1 | 3/2009 | Salvetti |
| 2009/0245500 A1 | 10/2009 | Wampler |
| 2009/0271192 A1 | 10/2009 | Marquette |
| 2010/0036788 A1 | 2/2010 | Wu |
| 2010/0063799 A1 | 3/2010 | Jamieson |
| 2010/0114563 A1 | 5/2010 | Choi |
| 2011/0077999 A1 | 3/2011 | Becker et al. |
| 2011/0082829 A1 | 4/2011 | Kolovski |
| 2011/0113094 A1 | 5/2011 | Chunilal |
| 2011/0206198 A1 | 8/2011 | Freedman |
| 2011/0264451 A1 | 10/2011 | Hoepfinger |
| 2012/0059776 A1 | 3/2012 | Estes |
| 2012/0078636 A1 | 3/2012 | Ferrucci |
| 2012/0233558 A1 | 9/2012 | Naim |
| 2012/0275642 A1 | 11/2012 | Aller |
| 2013/0006916 A1* | 1/2013 | McBride ............ G06Q 30/0601 706/52 |
| 2013/0091090 A1 | 4/2013 | Spivack et al. |
| 2013/0163731 A1 | 6/2013 | Yan |
| 2013/0204663 A1 | 8/2013 | Kahlow |
| 2014/0022328 A1 | 1/2014 | Gechter et al. |
| 2014/0081934 A1 | 3/2014 | Mizell |
| 2014/0122535 A1 | 5/2014 | Gerard |
| 2014/0156681 A1* | 6/2014 | Lee .................... G06F 16/9535 707/754 |
| 2014/0164502 A1 | 6/2014 | Khodorenko |
| 2014/0189680 A1 | 7/2014 | Kripalani |
| 2014/0201234 A1 | 7/2014 | Lee et al. |
| 2014/0270108 A1 | 9/2014 | Riahi et al. |
| 2014/0278343 A1 | 9/2014 | Tran |
| 2014/0314225 A1 | 10/2014 | Riahi et al. |
| 2014/0358638 A1* | 12/2014 | Sukumar ............ G06Q 30/0204 705/7.33 |
| 2014/0372630 A1 | 12/2014 | Bostick |
| 2014/0379755 A1 | 12/2014 | Kuriakose |
| 2015/0006248 A1* | 1/2015 | Li ...................... G06Q 10/06395 705/7.31 |
| 2015/0012350 A1* | 1/2015 | Li ...................... G06Q 10/06395 705/14.42 |
| 2015/0066479 A1 | 3/2015 | Pasupalak |
| 2015/0073929 A1* | 3/2015 | Psota ................. G06Q 30/0605 705/26.2 |
| 2015/0189085 A1 | 7/2015 | Riahi et al. |
| 2015/0201077 A1 | 7/2015 | Konig et al. |
| 2015/0242410 A1 | 8/2015 | Pattabhiraman et al. |
| 2015/0261743 A1 | 9/2015 | Sengupta |
| 2015/0294405 A1 | 10/2015 | Hanson |
| 2015/0332672 A1* | 11/2015 | Akbacak ............. G06F 16/637 704/257 |
| 2015/0348551 A1 | 12/2015 | Gruber |
| 2015/0379603 A1* | 12/2015 | Gupta ................ G06Q 30/0617 705/26.43 |
| 2016/0019882 A1 | 1/2016 | Matula |
| 2016/0021181 A1 | 1/2016 | Janakiev et al. |
| 2016/0034457 A1 | 2/2016 | Bradley |
| 2016/0036981 A1 | 2/2016 | Hollenberg |
| 2016/0036982 A1 | 2/2016 | Ristock |
| 2016/0036983 A1 | 2/2016 | Korolev |
| 2016/0048854 A1* | 2/2016 | Kahlow ............. G06Q 30/0256 705/7.31 |
| 2016/0117593 A1 | 4/2016 | London |
| 2016/0132789 A1* | 5/2016 | Flinn ................... G06F 40/216 706/14 |
| 2016/0162474 A1 | 6/2016 | Agarwal |
| 2016/0162913 A1* | 6/2016 | Linden ................. G06Q 50/01 705/7.31 |
| 2016/0171099 A1 | 6/2016 | Lorge et al. |
| 2016/0188686 A1 | 6/2016 | Hopkins |
| 2016/0189028 A1* | 6/2016 | Hu .......................... G06N 5/02 706/46 |
| 2016/0217479 A1* | 7/2016 | Kashyap ............ G06Q 30/0202 |
| 2016/0321748 A1 | 8/2016 | Tanner |
| 2016/0371724 A1* | 12/2016 | Kulpa ................. H04M 3/5158 |
| 2017/0017694 A1 | 1/2017 | Roytman et al. |
| 2017/0024375 A1 | 1/2017 | Hakkani-Tur |
| 2017/0091390 A1 | 3/2017 | Joul |
| 2017/0124193 A1 | 5/2017 | Li |
| 2017/0140405 A1* | 5/2017 | Gottemukkala ... G06Q 30/0206 |
| 2017/0147635 A1 | 5/2017 | McAteer et al. |
| 2017/0154108 A1* | 6/2017 | Kraus ................. G06F 16/243 |
| 2017/0177715 A1 | 6/2017 | Chang |
| 2017/0185674 A1* | 6/2017 | Tonkin ................ G06F 16/328 |
| 2017/0195488 A1 | 7/2017 | Pendyaia |
| 2017/0200220 A1 | 7/2017 | Nicholson |
| 2017/0262429 A1 | 9/2017 | Harper |
| 2017/0262530 A1 | 9/2017 | Okura |
| 2017/0293610 A1 | 10/2017 | Tran |
| 2018/0082183 A1 | 3/2018 | Hertz et al. |
| 2018/0115644 A1 | 4/2018 | Al-Khaja |
| 2018/0144250 A1 | 5/2018 | Kwon |
| 2018/0150459 A1 | 5/2018 | Farid |
| 2018/0247258 A1* | 8/2018 | Kolb ................... G06Q 10/087 |
| 2018/0285906 A1* | 10/2018 | Ng ....................... G06Q 50/01 |
| 2018/0288098 A1 | 10/2018 | Wang |
| 2018/0300310 A1 | 10/2018 | Shinn |
| 2018/0315000 A1 | 11/2018 | Kulkarni |
| 2018/0315001 A1 | 11/2018 | Garner |
| 2018/0338040 A1 | 11/2018 | Carly |
| 2018/0365710 A1* | 12/2018 | Halecky ................ G06F 16/35 |
| 2018/0365772 A1 | 12/2018 | Thompson |
| 2018/0376002 A1 | 12/2018 | Abraham |
| 2019/0042988 A1 | 2/2019 | Brown |
| 2019/0080370 A1 | 3/2019 | Copeland |
| 2019/0088617 A1 | 6/2019 | Copeland |
| 2019/0172075 A1* | 6/2019 | Kenkre ............. G06Q 30/0201 |
| 2019/0206400 A1 | 7/2019 | Cui |
| 2019/0220794 A1 | 7/2019 | Kulkarni |
| 2019/0294642 A1* | 9/2019 | Matlick ............... G06F 16/958 |
| 2019/0340294 A1 | 11/2019 | Spangler |
| 2020/0042642 A1 | 2/2020 | Bakis |
| 2020/0009781 A1 | 3/2020 | Devesa |
| 2020/0110835 A1 | 4/2020 | Zhao |
| 2020/0327378 A1* | 10/2020 | Smith ................. G06N 5/048 |

OTHER PUBLICATIONS

Li, Pingjiang. "Semantic reasoning on the edge of internet of things." 2016. University of Oulu, MS thesis. (Year: 2016).*

(56) References Cited

OTHER PUBLICATIONS

Koumenides, Christos L., and Nigel R. Shadbolt. "Ranking methods for entity-oriented semantic web search." 2014. Journal of the Association for Information Science and Technology 65.6 (2014): 1091-1106. (Year: 2014).*
Khriyenko, Oleksiy, and Vagan Terziyan. "A framework for context-sensitive metadata." (2006). (Year: 2006).*
International Search Report dated Nov. 28, 2018 for PCT/US2018/049813.
International Search Report dated Feb. 22, 2019 for corresponding PCT/US2018/065584.
Jul. 25, 2019 Office Action for related U.S. Appl. No. 16/198,742.
International Search Report and Written Opinion dated Dec. 30, 2019 for related PCT/US2019/062629.
International Search Report and Written Opinion dated Jan. 9, 2020 for related PCT/US2019/055488.
International Search Report and Written Opinion dated Jan. 14, 2020 for related PCT/US2019/060174.
International Search Report and Written Opinion dated Jan. 17, 2020 for related PCT/US2019/058997.
International Search Report and Written Opinion dated Mar. 9, 2020 for related PCT/US2019/059949.
International Search Report and Written Opinion dated Apr. 1, 2020 for related PCT/US2019/055483.

Liew. "Strategic integration of knowledge management and customer relationship 1-20 management." In: Journal of Knowledge Management. Jul. 18, 2008 (Jul. 18, 2008) Retrieved on Dec. 25, 2019 (Dec. 25, 2019) from <http://student.bms.lk/GDM/49/Slides/MarManaSampleAssi/MMAsuportingJouArti/13673270810884309.pdf> entire document.
Tung. "Google's human-sounding AI to answer calls at contact centers." In: ZDNet. Jul. 25, 2018 (Jul. 25, 2018) Retrieved on Dec. 25, 2019 (Dec. 25, 2019) from <https://www.zdnet.com/article/googles-human-sounding-ai-to-answer-calls-at-contact-centers/> entire document.
Jan. 10, 2020 Office Action for corresponding U.S. Appl. No. 15/700,210.
Mar. 5, 2020 Office Action for corresponding U.S. Appl. No. 16/183,736.
Final Office Action dated Jul. 30, 2020 for corresponding U.S. Appl. No. 16/154,718.
Final Office Action dated Jul. 7, 2020 for corresponding U.S. Appl. No. 15/700,210.
Non-Final Office Action dated May 4, 2020 for corresponding U.S. Appl. No. 16/154,718.
Non-Final Office Action dated Sep. 29, 2020 for corresponding U.S. Appl. No. 16/157,075.
Non-Final Office Action dated Sep. 30, 2020 for corresponding U.S. Appl. No. 16/911,717.

* cited by examiner

DYNAMIC LEAD GENERATION

BACKGROUND

Cloud-based products and web-services products, computing systems, and other software products are increasingly being sold over the phone by tele-agents. Such sales are often for complex systems and for very sophisticated customers. As an aid to interacting with the customer over the phone the tele-agents often use one or more applications that often include a dashboard that presents leads and their contact information to the tele-agents. Currently, identifying leads to provide to the tele-agent is painstakingly performed by people specializing in finding leads. The process is archaic and laborious. Furthermore, the leads so identified are not tied in real time with interest in the products being sold by the tele-agents. Therefore, tele-agents would be greatly benefited by being informed of surges in relevant customer interest for specific campaigns, related business/industry use cases, related interest from members of different operating divisions of the same company and being provided leads in real time that are relevant to that surge in customer interest.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
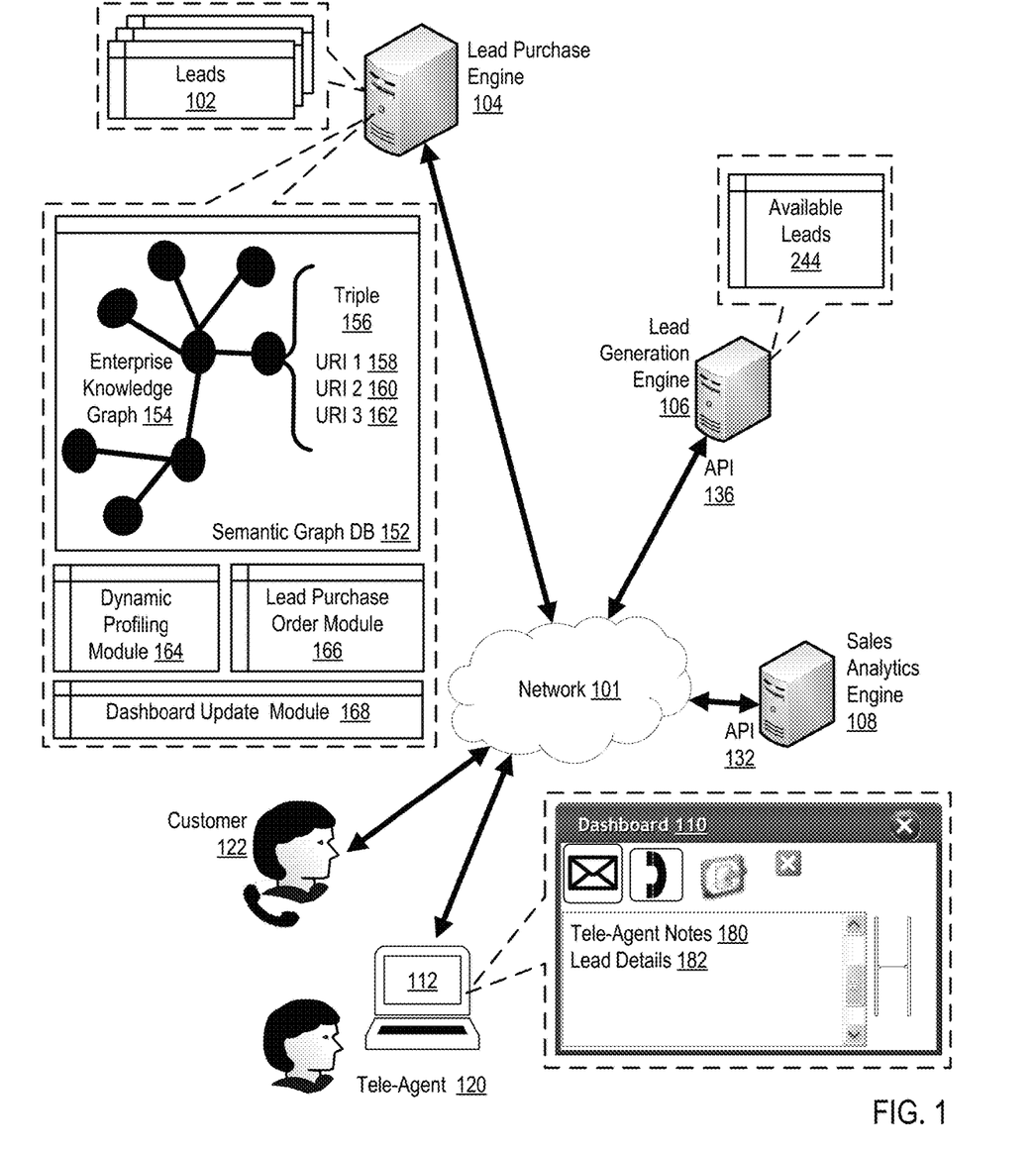
FIG. 1 sets forth a network diagram of a system for lead generation according to example embodiments of the present invention.

Methods, systems, products and other features for dynamic lead generation are described with reference to the accompanying drawings beginning with FIG. 1. FIG. 1 sets forth a network diagram of a system for lead generation according to example embodiments of the present invention. Cloud-based applications, web-services applications, computing systems and other software products are increasingly being sold over the phone by tele-agents. These tele-agents are often able to modularize and customize product offerings bringing increased efficiency and efficacy to their customers. For example, cloud-based or web-services products are highly customizable and various products may be combined to provide the best solution for the customer and can be further customized based upon region or industry. Such cloud-based web services often include computing applications, database applications, migration applications, network and content delivery applications, business management tools, business analytics, artificial intelligence, mobile services and many more applications. Examples of providers of such software, cloud-computing platforms, and web-services include Amazon, Microsoft, Oracle, and many others.

A tele-agent at that term is used in this specification is a person who handles incoming or outgoing customer calls for business, such as, for example, software, hardware or cloud-based web services sales. Such tele-agents are often subject matter experts regarding the products that they sell and support and often work in call centers handling sales, inquiries, customer complaints support issues and other related sales and support operations. The term tele-agent as it is used in this specification is meant to be inclusive and not limiting. Other example names for a tele-agent include call center agent, customer service representative (CSR), telephone sales or service representative (TSR), attendant, associate, operator, account executive or team member.

Tele-agents often work in a call center. Although those call centers may have a physical address almost anywhere in the world, tele-agents are typically not constrained by the physical address of the call center. Tele-agents often interact with customers worldwide and across many industries without regard to the physical location of the call center. Time with any customer is valuable and every tele-agent should have the most current and relevant leads available for a specific campaign to maximize the efficiency and efficacy of the agent. FIG. 1 therefore sets forth a network diagram of an example system for dynamic lead generation according to embodiments of the present invention. A lead, as that term is used in this specification, is structured data representing a customer or potential customer typically including a lead ID, lead name, company, role of the lead, address of the lead or company, phone number of the lead and other relevant information as will occur to those of skill in the art. Such a lead may be implemented as a record, message, object, or other data structure useful to automated computing machinery for automatic lead generation according to embodiments of the present invention.

The system of FIG. 1 procures leads in real time based upon near-term surges in interest in one or more products being sold by the tele-agent. The tele-agent is then provided these leads to improve the potential sales and support of the tele-agent. The phrase near-term surge means an increase in interest close to the current time. How close in time a surge needs to be to be considered near-term may vary according to many factors for that campaign such as size of surge, region of the world, product of interest, type of customer, sales objectives and factors, and many others as will occur to those of skill in the art.

The system of FIG. 1 includes a lead purchase engine (104) capable of querying various available resources, identifying a near-term surge in product interest for products, and providing in real-time leads based upon this information to a tele-agent (120) responsible for selling or supporting such products or similar products to or for a customer (122). Available resources may include resources inside and outside of a particular company operating the lead purchase engine and in various marketplaces for procuring leads. Such a lead purchase engine advantageously provides the tele-agent real-time and relevant leads for relevant products.

The lead purchase engine (104) of FIG. 1 is implemented as automated computing machinery for dynamic lead generation according to embodiments of the present invention. Automated computing machinery, as that phrase is used in this specification, means a module, segment, or portion of code or other automated computing logic, hardware, software, firmware, and others, as well as combination of any of the aforementioned, as will occur to those of skill in the art—both local and remote. Automated computing machinery is often implemented as executable instructions, physical units, or other computing logic for implementing the specified logical function(s) as will occur to those of skill in the art.

In the example system of FIG. 1, the lead purchase engine (104) includes a dynamic profiling module (164). The dynamic profiling module (164) of FIG. 1 is implemented as automated computing machinery configured to query a plurality of internal tele-agent dashboard applications (110) and receive, in response to the query, sales information identifying sales of products made by the tele-agent (120) associated with the tele-agent dashboard applications (110). Sales information of products made by the tele-agent (120) may be actual sales made by the tele-agent recorded in the process of the sale, interest in a product shown by a customer interacting with the tele-agent, relevant notes recorded by the tele-agent (120) regarding products sold by the tele-agent or any other relevant sales information that will occur to those of skill in the art.

A tele-agent dashboard application (110) is an application used by a tele-agent to organize and support telephonic sales. In the example of FIG. 1, the dashboard application (110) provides a vehicle for voice over internet protocol ('VOIP') telephony communications to a customer (122). The dashboard application (110) allows the tele-agent to record notes (180) describing the sales call and provides lead details (182) that are dynamically provided in real time based upon surges in interest in particular products sold or supported by the tele-agent.

Only one tele-agent is depicted in the example of FIG. 1. This is for ease of explanation and not for limitation. In typical embodiments, the dynamic profiling module (164) will query many tele-agent dashboard applications and receive sales information from many tele-agents.

The dynamic profiling module (164) of FIG. 1 is also configured to query one or more external sales analytics engines and receive, in response to the query, sales information identifying external sales of products for a number of companies. A sales analytic engine is an engine, typically implemented as a server, providing external sales information about various companies. Such an external sales analytics engine may be provided by a third party vendor who gathers sales information from various companies and publishes that information to its clients. Querying one or more external sales analytics may be carried out by invoking an application programming interface ('API') (132) exposed by the external sales analytic engine and receiving the information identifying external sales of products for a number of companies. Such information identifying external sales may include products being sold, how many products are being sold, companies purchasing those products, the industry of companies purchasing products, the size of those companies, the region of the world in which the products are being sold, and so on as will occur to those of skill in the art.

The dynamic profiling module (164) of FIG. 1 is also configured to identify a near-term surge in product interest for a number of companies of a particular size in a particular industry in a particular region of the world based upon the internal and external sales information received from the tele-agent dashboard applications (110) and the sales analytics engine (108). The near-term surge is typically implemented as structured data such as an array, file, record, object, message or other data structure and often includes a surge ID, a product ID, a company list, an industry, a size of company, a region of the world, and a value representing the strength of the surge.

The dynamic profiling module (164) of FIG. 1 is also configured to create a company profile in dependence upon the size of the identified companies, the industry of the identified companies, and the region of the world of the identified companies associated with the near-term surge. The company profile identifies companies of a particular industry and size and operating a particular region of the world. These companies are representative of companies purchasing products identified in the near-term surge in interest. Companies meeting the criteria of the company profile are considered more likely candidates to become customers of the product represented by the identified surge in interest. The company profile is also often implemented as structured data often including a profile ID, an industry, a size of company a region and a product, list of useful products or product type.

The lead purchase engine (104) of FIG. 1 also includes a lead purchase order module (166). The lead purchase order module (166) of FIG. 1 is implemented as automated computing machinery configured to generate an electronic lead purchase order in dependence upon the company profile, transmit the lead purchase order to a lead generation engine, and receive, from the lead generation engine, a plurality of leads in dependence upon the lead purchase order.

In the example of FIG. 1, the electronic lead purchase order is used to purchase leads from a lead generation engine (106). A lead generation engine (106) is typically implemented by a third party who sells leads and may expose an API (136) to the lead purchase engine such that the lead purchase order module may transmit the lead purchase order and receive leads in response.

The lead purchase engine (104) of FIG. 1 also includes a tele-agent dashboard update module (168). The tele-agent dashboard update module (168) is implemented as automated computing machinery configured to parse the leads received from the lead generation engine for one or more tele-agents and transmit the parsed leads to one or more tele-agent dashboard applications. Parsing the leads for the tele-agents provides to each tele-agents leads that are relevant to the sales, support, and products associated with the particular tele-agent and the unique aspects of the campaign for which they are engaged. In the example of FIG. 1, the lead details (182) are displayed to the tele-agent on the dashboard application (110) rendered on the tele-agent's computer (112).

The lead purchase engine (104) of FIG. 1 has available to it a semantic graph database (152) having stored within it a knowledge graph (154) having nodes populated with at least the sales information identifying sales of products made by the tele-agent associated with the tele-agent dashboard applications and the sales information identifying external sales of products for a number of companies. A graph database is a database that uses graph structures for semantic queries with nodes, edges and properties to represent and store data. A key concept of this database system is the graph (or edge or relationship), which directly relates data items in the data store. The relationships allow data in the store to be linked together directly, and in many cases retrieved with one operation.

The graph database contrasts with conventional relational databases, where links between data are stored in the data, and queries search for this data within the store and use the join concept to collect the related data. Graph databases, by design, allow simple and fast retrieval of complex hierarchical structures that are difficult to model in relational systems.

The underlying storage mechanism of graph databases can vary. Some depend on a relational engine and store the graph data in a table. Others use a key-value store or document-oriented database for storage, making them inherently NoSQL structures.

Retrieving data from a graph database often requires a query language other than SQL, which was designed for relational databases and does not elegantly handle traversing a graph. There are a number of systems, most often tightly tied to one product and there are some multi-vendor query languages like Gremlin, SPARQL, and Cypher. In addition to having query language interfaces, some graph databases are accessed through application programming interfaces (APIs).

Graph databases are based on graph theory, and employ nodes, edges, and properties. Nodes represent entities such as people, businesses, accounts, or any other item to be tracked. They are roughly the equivalent of the record, relation, or row in a relational database, or the document in a document database. Edges, also termed graphs or relationships, are the lines that connect nodes to other nodes; they represent the relationship between them. Meaningful patterns emerge when examining the connections and interconnections of nodes, properties, and edges. Edges are the key concept in graph databases, representing an abstraction that is not directly implemented in other systems. Properties are germane information that relate to nodes. For example, if N3 were one of the nodes, it might be tied to properties such as web-services support, cloud-computing, or a word that starts with the letter N, depending on which aspects of N3 are germane to a given database.

The graph database of FIG. 1 is a semantic graph database and stored within it is an enterprise knowledge graph (154). The example enterprise knowledge graph of FIG. 1 is implemented using the Resource Description Framework ('RDF'). The enterprise knowledge graph of FIG. 1 has each data item represented by a resource identifier. Such resource identifiers may include a uniform resource identifier ('URI'), an internationalized resource identifier ('IRI'), a uniform resource locator ('URL'), a literal, a non-literal, or any other resource identifier that will occur to those of skill in the art.

RDF makes resource identifier relationships between data items the central attribute of its overall data model. Resource identifiers, such as URI's, are created with data and liked together using relationships that are also named with resource identifiers, such as URI's.

The knowledge graph of FIG. 1 has the normal characteristics of mathematical directed graphs in that it consists of vertices (a.k.a. nodes) and directed edges. Each edge connects two vertices, has a type, and can have one or more properties. Each property is a key-value pair. The ability to type an edge and attach properties to it increases the semantic expressiveness of the knowledge graphs.

The RDF based knowledge graph of FIG. 1 has the notion of a logical triple (156), which consists of a subject (158), a predicate (160), and an object (162) each represented in FIG. 1 as a URI. In a triple, the subject and object are vertices and the predicate is the edge that connects the subject and object. The roles of subject and object imply the direction of the edge, which is from subject to object. An RDF graph consists of a set of triples. A database that contains RDF graphs is called a triple store.

The description of graph databases and semantic graph databases is for explanation and not for limitation. In fact, alternative embodiments may include SQL databases, relational databases, NoSQL, or any other viable database structure that will occur to those of skill in the art.

In the system of FIG. 1, the dynamic profiling module (164) identifies a near-term surge in product interest for a number of companies of a particular size in a particular industry in a particular region of the world by traversing the knowledge graph (154) and identifying from a plurality of nodes of the knowledge graph and the relationships among the plurality of the nodes of the knowledge graph a surge. These nodes and their relationships are implemented in the example of FIG. 1 as triples (156) of URIs (158, 160, and 162).

To identify the near-term surge, the dynamic profiling module of FIG. 1 employs a semantic reasoner. A semantic reasoner, often called a reasoning engine, rules engine, or simply a reasoner, is automated computing machinery to infer logical consequences from a set of asserted facts or axioms. The notion of a semantic reasoner generalizes that of an inference engine, by providing a richer set of mechanisms to work with. The inference rules are commonly specified by means of an ontology language, and often a description logic language. Many reasoners use first-order predicate logic to perform reasoning; inference commonly proceeds by forward chaining and backward chaining.

There are also examples of probabilistic reasoners, including non-axiomatic reasoning system, and probabilistic logic networks. Some such reasoners may be derived from machine learning. Machine learning is closely related to (and often overlaps with) computational statistics, which also focuses on prediction-making through the use of computers. Machine learning has strong ties to mathematical optimization, which delivers methods, theory and application domains to the field. Machine learning is sometimes conflated or equated with data mining, where the latter subfield focuses more on exploratory data analysis and is sometimes known as unsupervised learning.

Within the field of data analytics, machine learning is a method used to devise complex models and algorithms that lend themselves to prediction; in commercial use, this is known as predictive analytics. These analytical models allow researchers, data scientists, engineers, and analysts to "produce reliable, repeatable decisions and results" and uncover "hidden insights" through learning from historical relationships and trends in the data.

Figure 2:
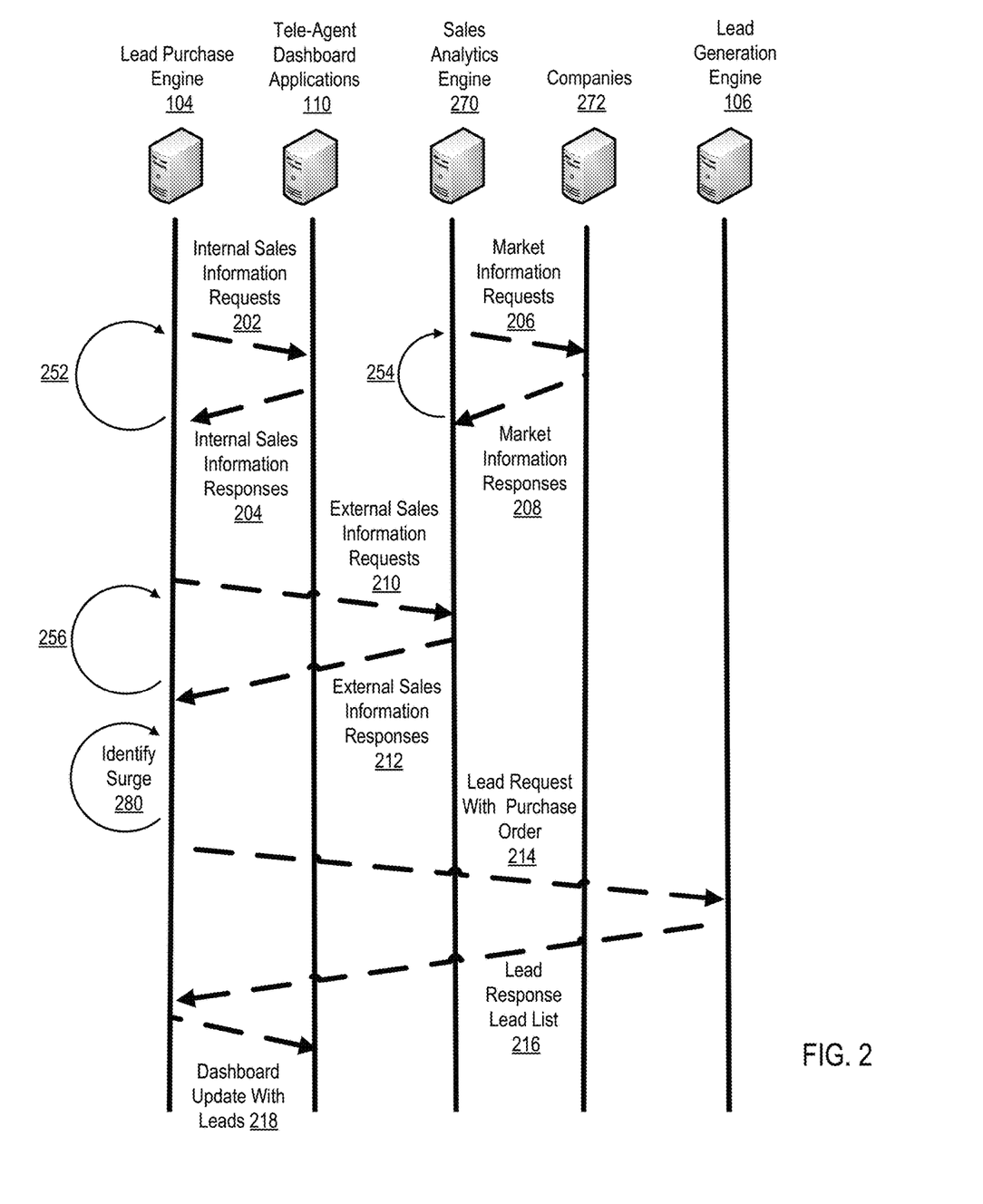
FIG. 2 sets forth a calling sequence diagram illustrating additional aspects of dynamic lead generation according to example embodiments of the present invention.

For further explanation, FIG. 2 sets forth a calling sequence diagram illustrating additional aspects of dynamic lead generation according to example embodiments of the present invention. In the example of FIG. 2, a lead purchase engine (104) sends an internal sales information request (202) to one or more tele-agent dashboard applications (110). The lead purchase engine of FIG. 2 receives in response to the request (202) internal sales information responses (204) from the tele-agent dashboard applications (110). The internal sales information responses of FIG. 2 typically contain information describing sales or potential sales made by the tele-agents in the form of products, sales, companies, customers, region of the world where the sale was made, additional notes made by the tele-agent or any other internal sales information that will occur to those of skill in the art. In the example of FIG. 2, the lead purchase engine repeats (252) sending requests (202) and receiving responses (204) until the lead purchase engine (104) has sufficient internal sales information for dynamic lead generation according to embodiments of the present invention as will occur to those of skill in the art.

In parallel with the lead purchase engine (104) sending the requests (202) and receiving responses (204) for internal sales information, a sales analytics engine (270) sends market information requests (206) to companies (272) and receives from those companies market information responses containing information about external sales made by the companies (272). The external sales information responses of FIG. 2 typically contain information describing sales or potential sales made by external companies often including products, sales, company IDs, customers, regions of the world where the sales were made, or any other external sales information that will occur to those of skill in the art. In the example of FIG. 2, the sales analytics engine (272) repeats (254) sending requests and receiving responses until the sales analytics has sufficient external sales information to provide to a lead purchase engine for dynamic lead generation according to embodiments of the present invention as will occur to those of skill in the art.

In the example of FIG. 2, the lead purchase engine (104) sends external sales information requests (210) to the sales analytics engine (270). The sales analytics engine (270) of FIG. 2 receives the request (210) and sends the external sales information it has gathered from the companies (272) in responses (212) to the lead purchase engine (104). In the example of FIG. 2, the lead purchase engine repeats (256) sending requests (210) and receiving responses (212) until the lead purchase engine (104) has sufficient external sales information for dynamic lead generation according to embodiments of the present invention as will occur to those of skill in the art.

In the example of FIG. 2, the lead purchase engine (104) identifies a surge in interest in a particular product. The surge in interest in the example of FIG. 2 is relevant to companies of a particular size, in a particular industry and in a particular region of the world. The lead purchase engine (104) then creates a purchase order for leads that meet the criteria of a company profile generated in dependence upon the particular size, industry and region of the companies represented in the surge.

In the example of FIG. 2, the lead purchase engine (104) sends a lead request (214) with a purchase order to a lead generation engine (106). The lead generation engine (106) retrieves a list of leads that meet the criteria of the lead purchase order in the request (216) and sends a response (216) with a list of leads for use by one or more tele-agents.

In the example of FIG. 2, the lead purchase engine (104) updates (218) one or more tele-agent dashboards with leads received from the lead generation engine (106). Such lead details may be presented to a tele-agent in real time on the tele-agents dashboard application allowing the tele-agent access to real-time and relevant leads for products currently experiencing a surge in customer interest.

Figure 3:
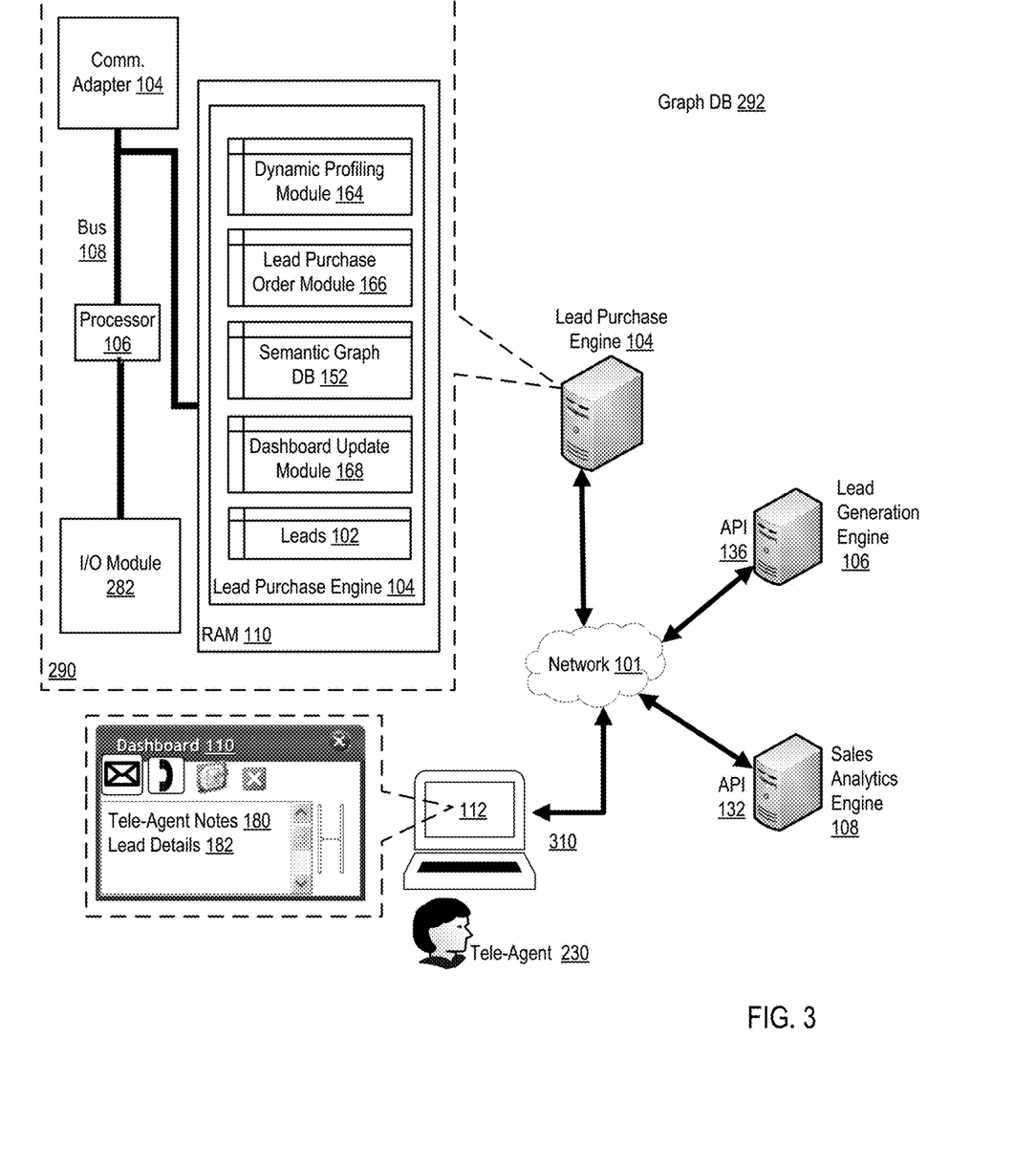
FIG. 3 sets a forth block diagram of an example system for dynamic lead generation according to embodiments of the present invention.

For further explanation, FIG. 3 sets a forth block diagram of an example system for dynamic lead generation according to embodiments of the present invention. The system of FIG. 3 includes a lead purchase engine (104) coupled for data communications through a network (101) to a number of remote resources including a sales analytics engine (108) and a lead generation engine (106). The remote resources (106 and 108) of FIG. 3 are presented in this example for explanation and not for limitation. In fact, dynamic lead generation according to embodiments of the present invention may include additional remote resources as will occur to those of skill in the art.

In the example of FIG. 3, the tele-agent is capable of viewing dynamically generated lead details (182) on a dashboard (110) displayed on a user interface (112) on a local computer (310). The computer (310) in the example of FIG. 3 is coupled for data communications through the network (101) to the lead purchase engine. (104). In various embodiments of the present invention, a computer used by the tele-agent may be implemented as local or remote to the lead purchase engine (104) as will occur to those of skill in the art.

In the example of FIG. 3, the lead purchase engine (104) is depicted as being implemented as software running on a server (290). This depiction is for explanation and not for limitation. As mentioned above, the dynamic script engine may be implemented in any number of permutations of automated computing machinery as will occur to those of skill in the art.

The example server (290) of FIG. 3 includes random access memory (110), a processor (106), a communications adapter (104), a video adapter (102), and an I/O module (202) connected to a data bus (108) and the lead purchase engine (104) is stored in RAM (110). The lead purchase engine (104) of FIG. 3 includes a dynamic profiling module (164), a lead purchase order module (166), a semantic graph database (152), a dashboard update module (168) and a number of leads stored in RAM whose details are displayed on the dashboard application (110) of the tele-agent (230).

As mentioned above, the dynamic profiling module (164) includes automated computing machinery configured to query a plurality of internal tele-agent dashboard applications (110) and receive, in response to the query, sales information identifying sales of products made by the tele-agent (230) associated with the tele-agent dashboard applications (110) and query one or more external sales analytics engines (108) and receive, in response to the query, sales information identifying external sales of products for a number of companies.

The internal and external sales information, as well as other information such as tele-agent IDs, products, lead details, companies, regions of the world, surges, sales history, marketing history, and other information is stored in the semantic graph database (152). This information may be stored in an enterprise knowledge graph using RDF triples as will occur to those of skill in the art.

The dynamic profiling module (162) of FIG. 3 is also configured identify, from the knowledge graph in the semantic graph database (152) a near-term surge in product interest for a number of companies of a particular size in a particular industry in a particular region of the world and create a company profile in dependence upon the size of the identified companies, the industry of the identified companies, and the region of the world of the identified companies associated with the near-term surge.

In the example of FIG. 3, the lead purchase engine (104) includes a lead purchase module (166). The lead purchase module (166) of FIG. 3 is configured to generate an electronic lead purchase order in dependence upon the company profile; transmit the lead purchase order to a lead generation engine; and receive, from the lead generation engine, a plurality of leads in dependence upon the lead purchase order.

In the example of FIG. 3, the lead purchase engine (104) includes a tele-agent dashboard update module (168). The tele-agent dashboard update module (168) is configured to parse the leads received from the lead generation engine for one or more tele-agents and transmit the parsed leads to one or more tele-agent dashboard applications.

Figure 4A:
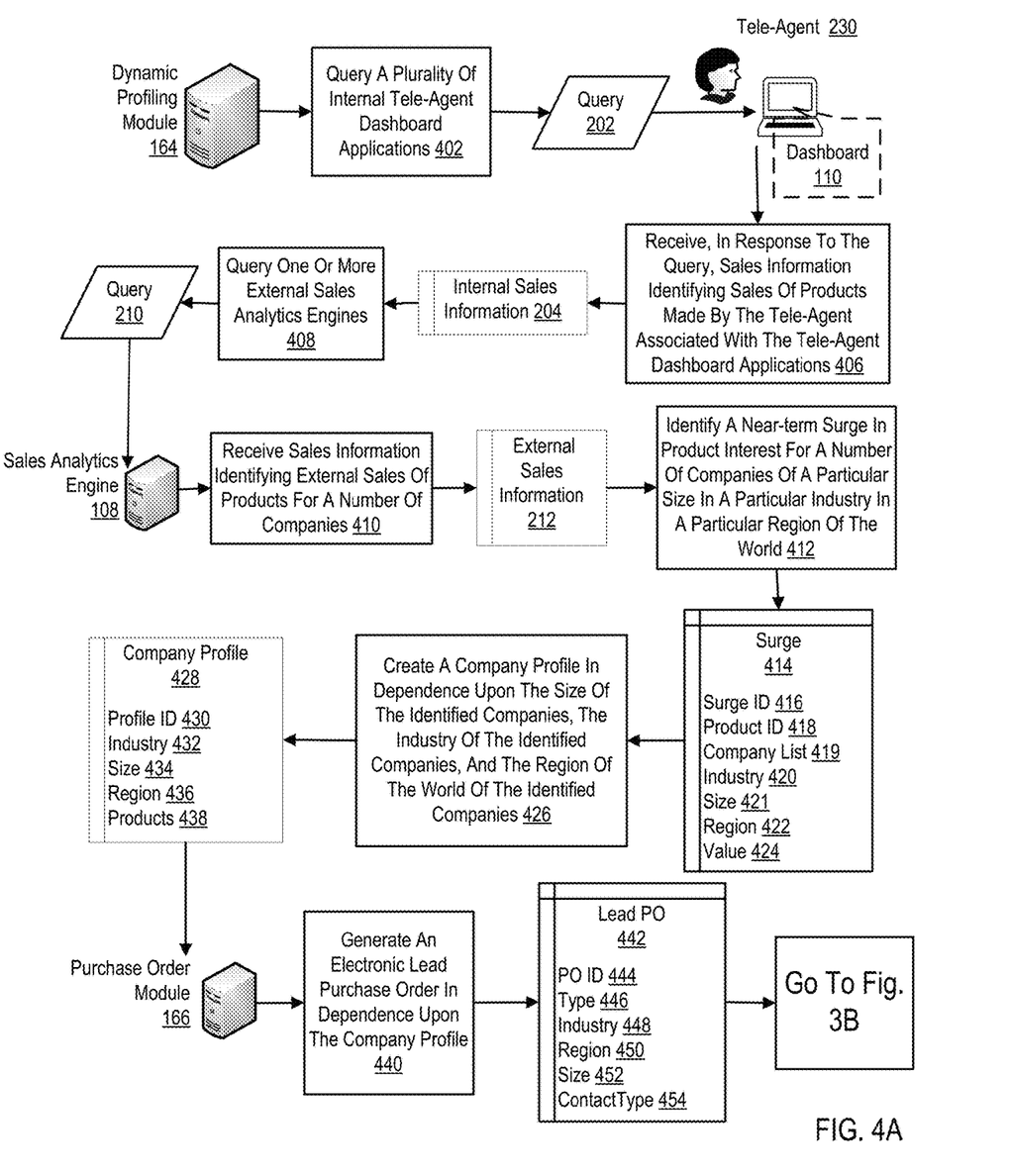
FIG. 4A and FIG. 4B collectively set forth a flow chart illustrating an example method of electronic lead generation according to embodiments of the present invention.
Figure 4B:
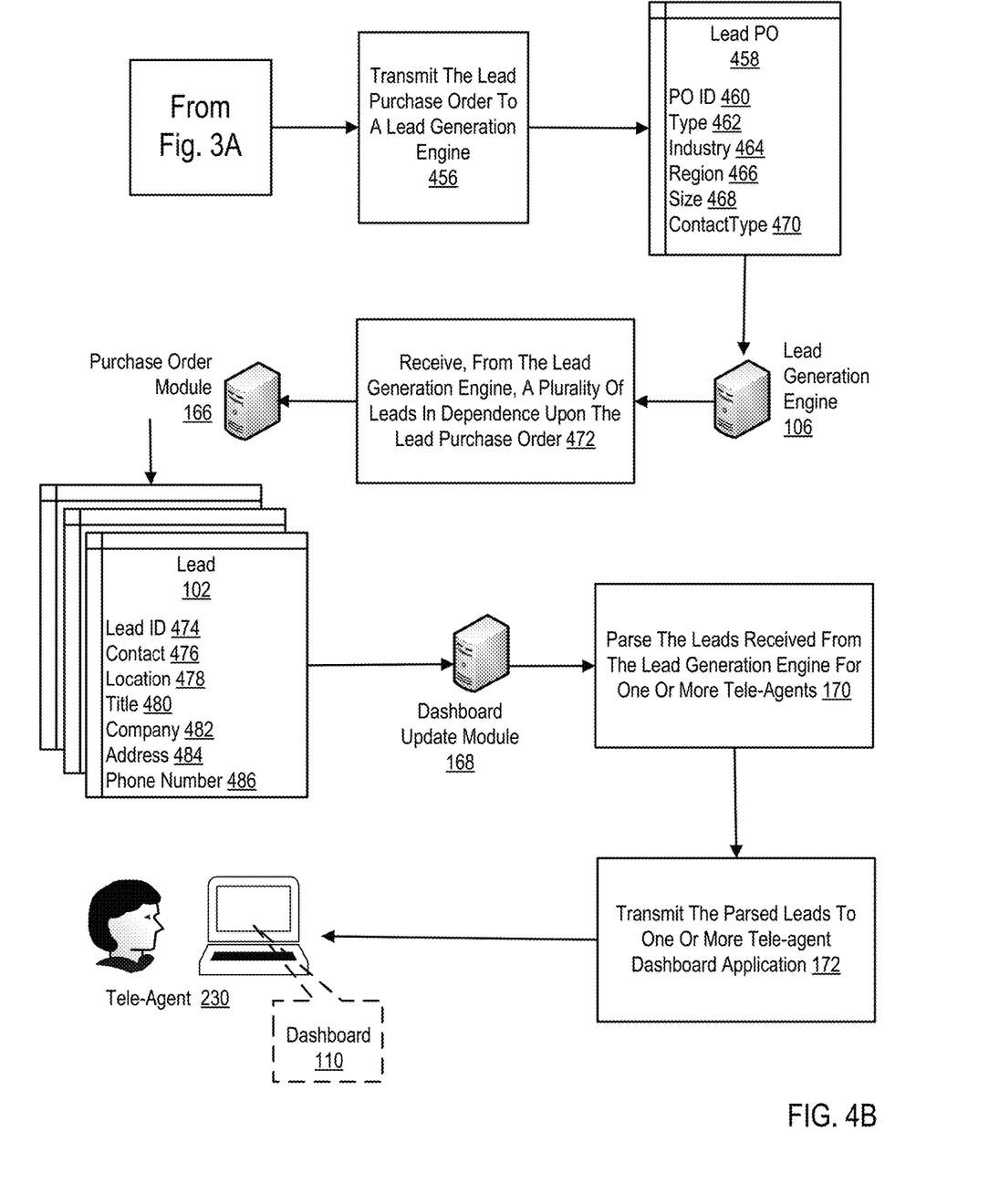

For further explanation, FIG. 4A and FIG. 4B collectively set forth a flow chart illustrating an example method of electronic lead generation according to embodiments of the present invention. The method of FIG. 4A includes querying (402), by a dynamic profiling module (164), a plurality of internal tele-agent dashboard applications (110) and receiving (406), in response to the query (202), sales information (204) identifying sales of products made by the tele-agent (230) associated with the tele-agent dashboard application (110).

As mentioned above, a tele-agent dashboard application (110) is an application used by a tele-agent to organize and support telephonic sales. Sales information of products made by the tele-agent (120) may be actual sales made by the tele-agent recorded in the process of the sale, interest in a product shown by a customer interacting with the tele-agent, relevant notes recorded by the tele-agent (120) regarding products sold by the tele-agent or any other relevant sales information that will occur to those of skill in the art.

In the example of FIG. 4A, the dynamic profiling module is implemented as automated computing machinery having access to a semantic graph database having stored within it a knowledge graph that stores sales information, leads, products sold and other information useful in dynamic lead generation according to embodiments of the present invention.

The method of FIG. 4A also includes querying (408), by the dynamic profiling module (164), one or more external sales analytics engines (108) and receiving (410), in response to the query (210), sales information (212) identifying external sales of products for a number of companies.

The method of FIG. 4 A also includes identifying (412), by the dynamic profiling module (164), a near-term surge (414) in product interest for a number of companies of a particular size in a particular industry in a particular region of the world. In the example of FIG. 4A a surge (414) is implemented as a data structure that includes a surge ID (416), a product ID (418), company list (419), an industry (420), size (421) a region (422), and a value (424). Identifying a near-term surge in product interest for a number of companies of a particular size in a particular industry in a particular region of the world according to the method of FIG. 4A may be carried out by traversing the knowledge graph stored in the semantic graph database and identifying from a plurality of the nodes of the knowledge graph and the relationships among the plurality of the nodes of the knowledge graph a surge. In some embodiments, a semantic reasoner may be used to identify a near-term surge in product interest as will occur to those of skill in the art.

The method of FIG. 4A includes creating (426), by the dynamic profiling module (164), a company profile (428) in dependence upon the size (421) of the identified companies (419), the industry (420) of the identified companies (419), and the region (422) of the world of the identified companies (419). The company profile of FIG. 4A is implemented as structured data including a profile ID (430), an industry type (432), a company size (434), a region of the world (436), and one or more products (438) identified as associated with the company profile.

The method of FIG. 4A also includes generating (440), by an electronic lead purchase order module (166) in dependence upon the company profile (428). The lead purchase order module (166) is implemented as automated computing machinery. The lead purchase order (442) of FIG. 4A is an electronic purchase order having data structure that includes a purchase order ID (444), a purchase order type (446), an industry (448), a region (450), a company size (452), and a contact type (454). Such a purchase order may be implemented as an array, a file, an object, a message, or other data type as will occur to those of skill in the art.

The method of FIGS. 4A and 4B continues now with FIG. 4B. The method of FIG. 4B includes transmitting (456), by the lead purchase order module, the lead purchase order (458) to a lead generation engine (106). A lead generation engine (106) is typically implemented by a third party who sells leads and may expose an API to the lead purchase engine such that the lead purchase order module may transmit the lead purchase order and receive leads in response. Transmitting (456), by the lead purchase order module, the lead purchase order (458) to a lead generation engine (106) may be carried out by invoking an API exposed by the lead generation engine.

The method of FIG. 4B includes receiving (472), from the lead generation engine (106), a plurality of leads (102) in dependence upon the lead purchase order (458). The plurality of leads may be sent as a lead list, a set of leads, a single file or data object, a message or in any other form or fashion as will occur to those of skill in the art.

The method of FIG. 4B also includes parsing (170) the leads (102) received from the lead generation engine (106) for one or more tele-agents (230). Parsing (170) the leads (102) received from the lead generation engine (106) for one or more tele-agents (230) may be carried out by selecting leads for a particular tele-agent or a set of tele-agents based on factors such as the products sold by those tele-agents, experience of the tele-agent, region of the world serviced by the tele-agent, industry serviced by the tele-agent and many other factors that will occur to those of skill in the art.

The method of FIG. 4B also includes transmitting (172) the parsed leads (102) to one or more tele-agent dashboard applications (110). Transmitting (172) the parsed leads (102) to one or more tele-agent dashboard applications (110) sending a message to the tele-agent dashboard application such that the lead details may be presented to the tele-agent.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

FIGS. 1-4B illustrate the architecture, functionality, and operation of possible implementations of systems, methods and products according to various embodiments of the present invention. In this regard, each block in a flowchart or block diagram may represent a module, segment, or portion of code or other automated computing machinery, which comprises one or more executable instructions or logic blocks for implementing the specified logical function(s). It should also be noted that, in some alternative implementations, the functions noted in the block may occur out of the order noted in the figures. For example, two blocks shown before or after one another may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A non-transitory computer-readable medium storing instructions, which, executed by one or more processors, implement a lead purchase engine, comprising:
 a dynamic profiling module;
 a lead purchase order module; and
 a dashboard update module, wherein the dynamic profiling module, the lead purchase order module, and the dashboard update module are configured to operate without direct tele-agent intervention to perform operations comprising:
  receiving, by the dynamic profiling module from a plurality of tele-agent dashboard applications, sales information identifying sales of products made by the tele-agent associated with the tele-agent dashboard applications,
  querying, by the dynamic profiling module, one or more external sales analytics engines and receiving, in response to the query, sales information identifying external sales of products for a number of companies,
  parsing the received tele-agent sales and the received external sales information into semantic triples and store the semantic triples in a knowledge graph of a semantic graph database, wherein each semantic triple comprises a respective a subject, a respective predicate, and a respective object, wherein the subjects and objects of the semantic triples are represented by nodes in the knowledge graph, and the predicates are represented by edges in the knowledge graph, wherein each data item in the semantic graph database is represented by a uniform resource identifier (URI), an internationalized resource identifier (IRI), or a uniform resource locator (URL),
  performing semantic reasoning of the knowledge graph of the semantic triples to identify a near term-surge in an interest in a product, wherein the identifying comprises identifying the near-term surge from a plurality of nodes of the knowledge graph and relationships among the plurality of the nodes of the knowledge graph, wherein the near-term surge identifies companies purchasing the product and is represented by data specifying the product, a company list being representative of the companies purchasing the product identified in the near-term surge in the interest, an industry, company size information, a region of the world, and a value representing a strength of the near-term surge, wherein performing semantic reasoning of the knowledge graph comprises implementing a probabilistic logic network derived from machine learning,
  creating, by the dynamic profiling module, a company profile associated with the near-term surge, the company profile including criteria for one or more companies that are likely candidates to become customers of the product associated with the near-term surge and being represented by data specifying a profile ID, the industry, the company size information, the region, and product information of the product,
  generating, by the lead purchase order module, an electronic lead purchase order in dependence upon the company profile,
  transmitting, by the lead purchase order module, the lead purchase order to a remote third-party lead generation engine,
  receiving, by the lead purchase order module from the lead generation engine, a plurality of leads in dependence upon the lead purchase order,
  parsing, by the lead purchase order module, the leads received from the lead generation engine for one or more tele-agents, and
  updating, by the dashboard update module, one or more tele-agent dashboard applications to include the parsed leads.

2. The non-transitory computer-readable medium of claim 1 wherein the dynamic profiling module further comprises the semantic graph database having stored within it the knowledge graph having nodes populated with the sales information identifying the sales of the products made by the tele-agent associated with the tele-agent dashboard applications and the sales information identifying external sales of the products for the number of companies.

3. The non-transitory computer-readable medium of claim 2, wherein the knowledge graph includes the plurality of nodes, each node including three resource identifiers.

4. The non-transitory computer-readable medium of claim 1, wherein the dynamic profiling module is configured to invoke an application programming interface ('API') exposed by the one or more sales analytics engines.

5. The non-transitory computer-readable medium of claim 1, wherein each lead of the plurality of leads comprises structured data implemented with a data structure including at least a lead name, a lead role, and a lead organization.

* * * * *

UNITED STATES PATENT AND TRADEMARK OFFICE
CERTIFICATE OF CORRECTION

| | | |
|---|---|---|
| PATENT NO. | : 11,853,930 B2 | Page 1 of 1 |
| APPLICATION NO. | : 15/844512 | |
| DATED | : December 26, 2023 | |
| INVENTOR(S) | : Shannon L. Copeland and Burton M. Smith, III | |

It is certified that error appears in the above-identified patent and that said Letters Patent is hereby corrected as shown below:

On the Title Page

Item (72), Line 1, delete "CA" and insert -- GA --.

In the Claims

In Claim 1, Column 11, Line 8, after "which," insert -- when --.

In Claim 2, Column 12, Line 32, delete "1" and insert -- 1, --.

In Claim 2, Column 12, Line 33, after "within" delete "it".

Signed and Sealed this
Thirteenth Day of February, 2024

*Katherine Kelly Vidal*

Katherine Kelly Vidal
*Director of the United States Patent and Trademark Office*